(12) United States Patent
Michalakos et al.

(10) Patent No.: US 6,503,462 B1
(45) Date of Patent: Jan. 7, 2003

(54) SMART AIR CLEANING SYSTEM AND METHOD THEREOF

(75) Inventors: Peter Michalakos, Chicago, IL (US); Robert Tom, Redondo Beach, CA (US); Karin Arnold, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/888,204

(22) Filed: Jun. 19, 2001

(51) Int. Cl.[7] .................................................. F01N 3/10
(52) U.S. Cl. ....................................... 422/173; 422/198
(58) Field of Search ................................. 422/171, 173, 422/168, 177, 190, 198

(56) References Cited

U.S. PATENT DOCUMENTS

| | | | |
|---|---|---|---|
| 3,455,089 A | * | 7/1969 | Mattia ...................... 423/215.5 |
| 3,654,432 A | | 4/1972 | Dyre .......................... 219/374 |
| 3,772,851 A | | 11/1973 | Duffey |
| 4,530,272 A | | 7/1985 | Stokes |
| 4,733,605 A | * | 3/1988 | Holter et al. ................ 454/158 |
| 4,742,761 A | | 5/1988 | Horstman |
| 4,881,957 A | | 11/1989 | Shofner .......................... 55/97 |
| 5,061,455 A | | 10/1991 | Brose et al. |
| 5,461,368 A | | 10/1995 | Comer ....................... 340/607 |
| 5,464,369 A | | 11/1995 | Federspiel |
| 5,742,516 A | | 4/1998 | Olcerst |
| 5,744,811 A | * | 4/1998 | Schonberg et al. ...... 250/492.3 |
| 5,798,455 A | * | 8/1998 | Sakata et al. ................ 454/187 |
| 5,914,091 A | * | 6/1999 | Holst et al. .................. 422/171 |
| 5,976,010 A | | 11/1999 | Reese et al. |
| 6,018,943 A | | 2/2000 | Martin et al. .................. 60/274 |
| 6,027,550 A | * | 2/2000 | Vickery ...................... 422/143 |
| 6,190,627 B1 | * | 2/2002 | Hoke et al. .................. 423/219 |
| 2002/0018742 A1 | * | 2/2002 | Hoke et al. .................. 423/219 |

FOREIGN PATENT DOCUMENTS

| | | |
|---|---|---|
| DE | 87 11 112 | 1/1989 |
| DE | 40 12 119 | 10/1991 |
| JP | 2000-104946 | 4/2000 |
| JP | 2000-310437 | 11/2000 |
| WO | WO 01/66258 | 9/2001 |

\* cited by examiner

*Primary Examiner*—Harold Joyce
(74) *Attorney, Agent, or Firm*—William J. Zak, Jr., Esq.

(57) ABSTRACT

An air cleaning system and method employs both particulate and gaseous contaminant removal from a flowing air stream to improve air quality in a selected environmental space. Particulate contaminants are removed by an appropriate filter. Gaseous contaminants such as VOCs, CO, and $O_3$ are removed using a catalyst to oxidize such contaminants. The air stream is selectively heated to provide an adequate catalyst reaction temperature and the heat energy is then recovered by a heat exchanger. Various sensors are employed to monitor flow rate, air composition, temperature and pressure. A controller is programmable to control air quality for either minimizing contaminants or minimizing energy usage required to achieve a selected minimum air quality over a period of time.

22 Claims, 1 Drawing Sheet

SMART AIR CLEANING SYSTEM AND METHOD THEREOF

BACKGROUND OF THE INVENTION

The present invention relates to air treatment systems and, more particularly, to a "smart" air cleaning system such as for volatile organic compounds and carbon monoxide that may exist in a variety of environments.

There is substantial public and government concern over contaminated air in commercial and residential buildings because of the impact on health and safety, odors, and comfort. This is especially true of modern "tight" buildings where the outside ventilation rates are low to reduce air-conditioning and heating costs, and also in locations where the outdoor air itself is contaminated. Most air treatment technologies remove particulates, but do not reduce odorous or harmful gaseous contaminants, like volatile organic compounds (VOCs), carbon monoxide (CO), or ozone ($O_3$). Those that do address these additional contaminants produce significant disadvantages. Adsorbent filters require frequent replacement, have high-pressure drops, and have difficulty removing the lighter of the VOCs, CO, and $O_3$. Catalytic systems have longer lifetimes, less maintenance, and treat a wider variety of contaminants. However, a drawback has been the energy cost of heating the airflow to reaction temperature on a full-time basis.

U.S. Pat. No. 5,742,516 for Indoor Air Quality And Ventilation Assessment Monitoring Device discloses sensors, the outputs of which control an air handler which governs air flow rates and thus ventilation rate. Fundamentally, the '516 patent discloses a device which improves air quality by diluting a contaminated air stream with a less contaminated air stream. The '516 patent device relies on a mixing of external air and internal air using the air handler to control fan speed, dampen settings and filtration depending on detectors which monitor the extent of a selected air contaminant such as carbon monoxide, methane or ozone.

U.S. Pat. No. 5,976,010 for Energy Efficient Air Quality Maintenance System And Method discloses a heating, ventilation and air conditioning system which employs air contaminant sensors and compares their measurements to setpoints or standards. The focus is on the air contaminant $CO_2$ and the air quality improvement is also through dilution with less contaminated air (i.e., less $CO_2$).

U.S. Pat. No. 3,772,851 for Dust Monitoring System And Method discloses the removal of particulates from industrial exhaust. The system compares overall particulate level to a standard and then varies the amount of contaminated flow to treat depending upon the extent of overall contamination sensed.

As can be seen, there is a need for an air cleaning system that eliminates VOCs and other gaseous contaminants, as well as particulates.

SUMMARY OF THE INVENTION

The present invention improves air quality by eliminating unwanted VOCs that are of high health and safety concern. In one aspect of the present invention, the energy burden that catalytic oxidation requires is reduced through integration of sensors to measure contaminant concentrations and occupancy, and a control methodology to match treatment efficiency to a specified air quality standard. The controller may be programmed with many algorithms, including prediction of catalyst efficiency, which increases with increasing temperature and decreasing flowrate.

In another aspect of the present invention, the VOC concentration in the treatment space decreases with increasing number of air exchanges through the system; and larger differences between actual VOC concentration and desired concentration require more air treatment. In this way the present invention operates when air treatment is needed and conserves power when air quality is acceptable. Unlike the device of the '516 patent disclosure, the present invention employs sensor outputs to control an air cleaner. Control of the air cleaner is achieved by monitoring air contaminant concentrations in both the inlet and outlet of the air cleaner, and by knowledge of the air cleaner's efficiency that, under a given set of conditions, can predict contaminant concentrations in the outlet and enclosed space.

Thus, in yet another aspect of the present invention the air cleaner of the present invention may self-select operating conditions (flow rate and temperature) that achieve the desired air quality or that minimize energy in achieving satisfactory air quality.

These and other features, aspects and advantages of the present invention will become better understood with reference to the following drawing, description and claims.

BRIEF DESCRIPTION OF THE DRAWING

The FIGURE herein is a block diagram of an embodiment of the present invention.

DETAILED DESCRIPTION OF THE INVENTION

Figure 1:
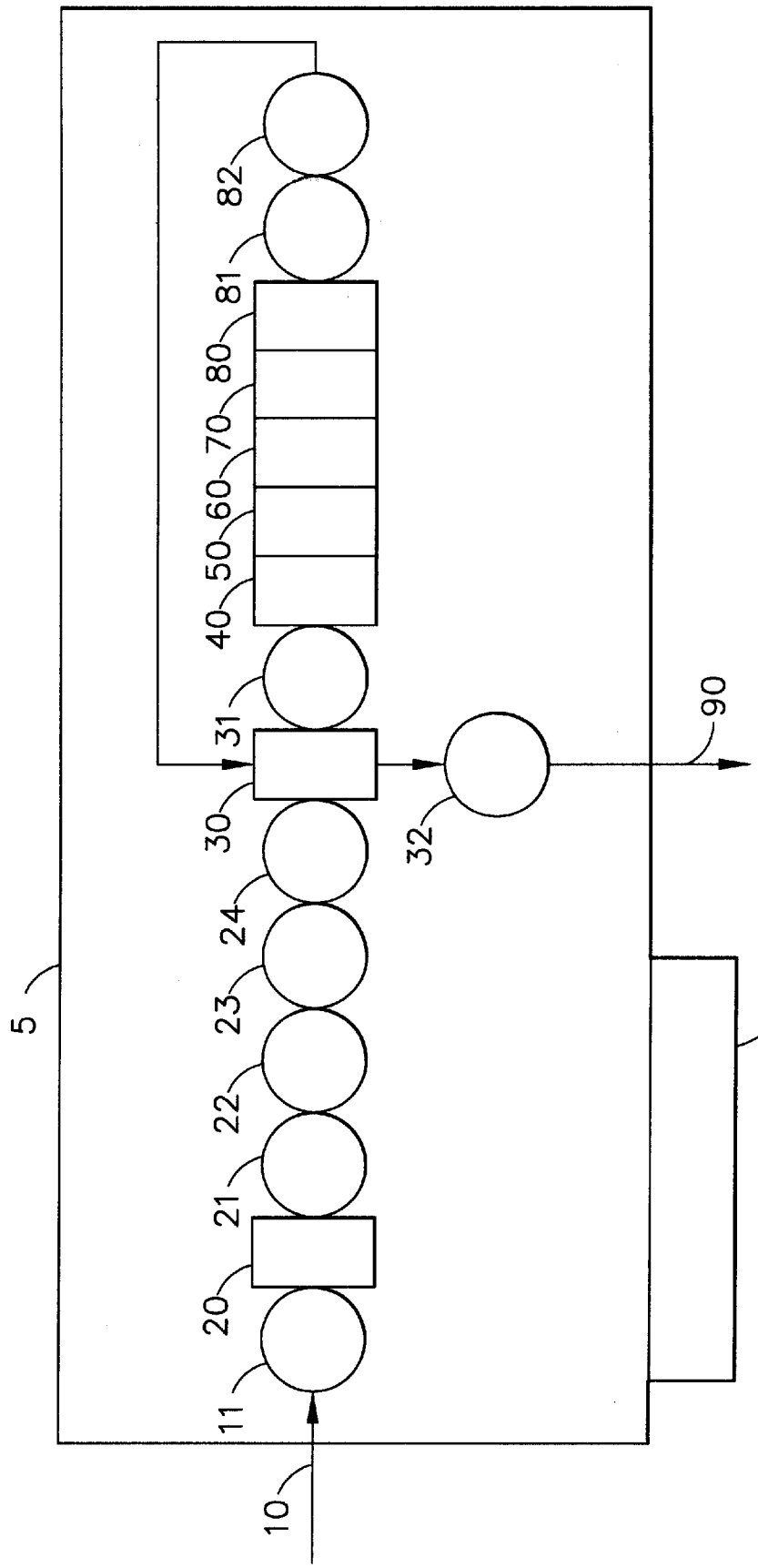

The following detailed description is the best currently contemplated modes for carrying out the invention. The description is not to be taken in a limiting sense, but is made merely for the purpose of illustrating the general principles of the invention.

It will be seen that the present invention differs in a number of ways from the prior art. One such difference relates to the use of air flow heating to permit catalyst reaction to remove VOCs and CO, the use of temperature sensors to provide a proper amount of heating, and the inclusion of a heat exchanger to recover a portion of the energy employed to heat the air stream. Another difference is the use of a controller to receive sensor data, and to control the heater and air stream flow rate to clean the air stream using catalyst reaction and adsorbent. Still another such difference is use of the controller to run an algorithm which can achieve desired air quality in minimum time or with minimum energy expenditure.

Referring to the FIGURE, a smart air cleaning system 5 in accordance with the present invention is shown. Its components in one embodiment may comprise pressure sensors 11 and 21 on either side of a particulate filter 20; temperature, composition and flow rate sensors 22, 23 and 24 in front of or upstream of a heat exchanger 30; temperature sensors 31 and 32; a heater 40; a blower 50; catalyst devices 60 and 70; adsorbent device 80; temperature and composition sensors 81 and 82; and a controller 91.

Typical operation may be as follows. An air stream 10—such as from a land vehicle, aircraft, or building—is brought into the particulate filter 20 to remove mists and particulates. The particulate filter 20 may be of a well-known design such as, -a pleated, panel filter-. The air stream pressure on either side of the filter is measured by sensors 11 and 21. The air temperature, composition, and flowrate are measured by sensors 22, 23 and 24, respectively. Alternatively, composition sensor 23 may be located in one or more locations throughout the space to be treated. The air stream 10 is then preheated by heat exchanger 30—such as an air-to-air heat exchanger of any well-known design—and the resulting temperature is read by sensor 31. Depending upon the difference between temperature at sensor 31 and the required operating temperature, the stream may be further heated by heater 40, such as an electric or gas fired heater.

In installations where the present invention does not receive forced air, the air stream 10 may be moved through the present invention with the blower 50, such as one having either an axial or centrifugal design. The VOCs and CO may be oxidized over catalyst 60, where $O_3$ may be decomposed over catalyst 70. Useful catalysts 60 may include noble metals such as platinum and gold or transition metals such as manganese, iron, and cobalt, supported on high surface-area metal oxides such as alumina, silica, and titania and in a bed-type arrangement, for example. Useful catalysts 70 may include noble metals such as palladium and silver or transition metals such as manganese or copper supported on high surface-area metal oxides such as alumina, silica, and titania and in a bed-type arrangement, for example. Alternatively, the catalysts 60, 70 may be placed in the opposite order or combined into a single unit. By-products such as acid gases or nitric oxides are removed by the adsorbent 80. The temperature and composition of the treated air are read by sensors 81 and 82, respectively. Energy is recovered from the treated stream by passing it through heat exchanger 30. The temperature of the treated air is read by sensor 32 before returning that air to the environmental space 90.

Data from the sensors are collected by controller 91. The controller is also the user interface and allows for programming of algorithms, control actions, and setting of air quality standards. The controller 91 may have a microprocessor to facilitate such programming. A further input into the controller can be the occupancy level of the environmental space, which allows efficient operation of the invention when the space is occupied. The controller 91 may automatically adjust the temperature and flowrate of the air stream to achieve or maintain the desired air quality in a timely manner. Further, the standards (setpoints) and control methodology may be programmed remotely, e.g., in a wireless fashion using an Internet connection. In one embodiment, the controller may be programmed to take into account the known efficiencies of respective catalyst devices based upon variations in air stream temperature and flow rate.

The smart air cleaning system 5 may be deployed in different ways. The terminal mode and the central mode are two examples of possible deployment. In the terminal mode, the present invention operates as a stand-alone unit and can be made to be portable. In the central mode, the present invention is incorporated directly into the heating, ventilation and air conditioning ductwork of a vehicle, building or other structure, as examples. Forced air circulation and some heating are provided to the unit. In either mode, the sensors and control methodology allow the present invention to be customized for a specific problem statement.

It will now be apparent that the invention has been described in regard to one illustrative embodiment. It will be understood that other embodiments are contemplated and those having the benefit of the above disclosure will readily perceive such other embodiments. By way of example, where the present invention is integrated into an existing structure having an existing air flow and heating system, the blower and the heater of the existing system may be made a part of the invention thereby obviating the need for a separate blower and heater as described herein in regard to the preferred embodiment.

Thus, the scope of the invention hereof is to be limited only by the appended claims and their equivalents.

We claim:

1. An air cleaning system for reducing air contaminants within a selected interior volume, the system comprising:
    at least one catalyst device for oxidizing gaseous contaminants in said interior volume;
    a plurality of sensors for determining selected characteristics of air of said interior volume, said plurality of sensors having at least one temperature sensor for measuring the temperature of said air of said interior volume within said cleaning system and at least one flow sensor;
    a blower for increasing flow rate of an air stream through said air cleaning system;
    a heater for raising the temperature of said interior volume air within said cleaning system for enabling reaction of said gaseous contaminants with said at least one catalyst device; and
    a controller unit receiving signals from said plurality of sensors and controlling said heater in accordance with an output of said at least one temperature sensor and controlling said blower in accordance with an output of said at least one flow sensor.

2. The air cleaning system recited in claim 1 wherein at least one of said plurality of sensors is a composition sensor.

3. The air cleaning system recited in claim 1 wherein at least one of said plurality of sensors is a pressure sensor.

4. The air cleaning system recited in claim 1 further comprising at least one filter for removing particulate contaminants from air within said interior volume.

5. The air cleaning system recited in claim 1 further comprising an adsorbent device for removing by-products of said at least one catalyst device.

6. The air cleaning system recited in claim 1 further comprising a heat exchanger for recovering heat from air in said system heated by said heater and output from said at least one catalyst device.

7. The air cleaning system recited in claim 1, said controller having a user input setting control for permitting an occupant to select a parameter relating to the degree of air contaminant reduction in said air cleaning system.

8. The air cleaning system recited in claim 7, said controller having an additional input based upon the occupancy level of said interior volume.

9. The air cleaning system recited in claim 1, said controller system having a programmable processor for controlling said air cleaning system in a selected variable manner over a period of time.

10. An air cleaning system for use in a substantially enclosed environmental space for reducing air contaminants within the space, such contaminants including particulate and gaseous contaminants, the system comprising:
    a blower forming an air stream through the system;
    a filter for removing said particulate contaminants from said air stream;
    a heater for raising the temperature of said air stream;
    a catalyst device for oxidizing said gaseous contaminants in said heated air stream;
    a heat exchanger for recovering heat energy from said heated air stream output from said catalyst device;

at least one temperature sensor for determining the temperature of said air stream;

at least one flow rate sensor for determining the flow rate of said air stream; and a controller unit receiving a first output of said at least one temperature sensor and controlling said heater in accordance with said first output, and receiving a second output of said at least one flow sensor and controlling said blower in accordance with said second output.

11. The air cleaning system recited in claim 10, further comprising a pair of pressure sensors, one such pressure sensor upstream of said filter and one said pressure sensor downstream of said filter for determining air stream pressure drop through said air filter.

12. The air cleaning system recited in claim 10, further comprising at least one composition sensor for determining the amount of selected contaminants in said air stream.

13. The air cleaning system recited in claim 10, further comprising an adsorbent device for removing by-products of said catalyst device from said air stream.

14. The air cleaning system recited in claim 10, wherein said controller has a user input setting control for permitting an occupant to select a parameter relating to the degree of air contaminant reduction in said air cleaning system.

15. The air cleaning system recited in claim 14, wherein said controller has an additional input based upon the occupancy level of said interior volume.

16. The air cleaning system recited in claim 10, wherein said controller has a programmable processor for controlling said air cleaning system in a selected variable manner over a period of time.

17. An apparatus for reducing particulate and gaseous contaminants in a substantially enclosed environment, the apparatus comprising:

a blower creating a stream of air through said apparatus;

a particulate filter for removing said particulate contaminants in said stream;

a pair of pressure sensors, one said pressure sensor located adjacent said filter upstream and one said pressure sensor located adjacent said filter downstream for measuring the pressure differential through said filter;

a series of sensors for measuring temperature, composition and flow rate of said stream downstream of said filter;

a heat exchanger located downstream of said series of sensors;

a heater located downstream of said heat exchanger for selectively heating said stream of air;

at least one catalyst device for oxidizing at least one said gaseous contaminants in said air stream, said heater raising the temperature of said stream to cause an oxidizing reaction in said catalyst device;

an adsorbent device located downstream of said at least one catalyst device for removing by-products of said reaction from said stream; the stream emanating from said adsorbent device being returned to said heat exchanger to transfer heat energy from said emanating stream to said stream of air upstream of said heater; and a controller receiving signals from said series of sensors and responsively controlling said blower and said heater to achieve a desired reduction of said contaminants within said enclosed environment.

18. A method for reducing air contaminants in a substantially enclosed environmental space, the method comprising the steps of:

a) providing an air stream;

b) passing said air stream through a heater and measuring the temperature of the air stream emanating from said heater;

c) oxidizing gaseous contaminants in said air stream by reacting such contaminants in a catalyst;

d) recovering heat energy from said air stream by passing said air stream through a heat exchanger; and e) controlling the flow rate of said air stream and the temperature of said heater to improve the air quality of said environmental space according to a selected program.

19. The method recited in claim 18, further comprising the step of:

e) passing said air stream through a particulate filter to remove particulate contaminants from said air stream.

20. The method recited in claim 18, further comprising the step of:

e) adsorbing by-products of the oxidizing step c).

21. The method recited in claim 18, further comprising the step of:

e) sensing the level of contaminants in said air stream and controlling said heater and the flow rate of said air stream to reduce said level.

22. The method recited in claim 18 wherein step e) is carried out based upon known data regarding oxidizing efficiency of said catalyst with variable air stream temperature and flow rate.

* * * * *